Feb. 2, 1960 H. TÖPFER ET AL 2,923,774

AUTOMATIC TELEPHONE SYSTEM

Filed Jan. 13, 1956 2 Sheets-Sheet 1

Inventors.
Herbert Töpfer, &
Alfred Scheunert.
By. [signature] Atty.

Feb. 2, 1960 H. TOPFER ET AL 2,923,774

AUTOMATIC TELEPHONE SYSTEM

Filed Jan. 13, 1956 2 Sheets-Sheet 2

Inventors.
Herbert Töpfer, &
Alfred Scheunert.
By [signature] Atty.

United States Patent Office 2,923,774

Patented Feb. 2, 1960

2,923,774

AUTOMATIC TELEPHONE SYSTEM

Herbert Töpfer, Munich, and Alfred Scheunert, Berlin-Siemensstadt, Germany, assignors to Siemens & Halske Aktiengesellschaft, Munich and Berlin, Germany, a corporation of Germany Application January 13, 1956, Serial No. 559,015

Claims priority, application Germany February 2, 1955

11 Claims. (Cl. 179—16)

This invention relates to signaling systems and is particularly concerned with an automatic telephone system having switches of the vertical-rotary type.

In such systems, there is the requirement, for the purpose of uniform line numbering in connection with calls within individual exchanges as well as in connection with calls involving different exchanges, to set one and the same switch, first in accordance with a predetermined digit, and thereafter in accordance with another digit denoting a different traffic direction. For this reason, the switch must be released after receiving the first series of impulses, so that it can be reset again responsive to a further series of impulses designating the desired traffic direction. Vertical-rotary switches of this type are sometimes referred to as digit suppressors or digit absorbers.

If the corresponding switch is provided with a release magnet, for example, a Strowger switch, such magnet is actuated subsequent to the impulse series which is to be suppressed so as to return the wipers to the initial position. The release is effected quickly and the switch is then ready to receive the desired next impulse series. There are, however, switches of the vertical rotary type which are released by further stepping in the rotary direction, followed by dropping of the switch shaft and wipers upon overrunning of the bank contacts in the corresponding level, and rotation back to initial or normal position, the wipers going through a rectangular path. In other words, such switches are not equipped with special release magnets. The return of such a switch to normal position requires a longer time interval than a Strowger switch, due to the longer path, through which the wipers have to travel, and there appears the difficulty that the wipers have not reached their normal position when the next successive impulse series arrives.

The object of the invention is to effect, in the use of such rectangular path switches as digit suppressors, quick restoration into the normal position. This object is realized by releasing the vertical magnet under control of a device which marks the type of the selected decade or level, after absorption of an impulse series that is to be suppressed, thereby effecting instant dropping of the switch shaft and wipers into normal position, while keeping the vertical magnet energized after absorption of an impulse series which is to be effectively used, for an initial interval of the rotary wiper motion, thereby preventing the release operation. A particular advantage of the arrangement according to the invention resides in the fact that the corresponding switch restores to normal position immediately after receiving an impulse series which is to be suppressed, without executing a rotary wiper motion across the entire contact bank, just like known vertical-rotary switches, for example, of the Strowger type, which are provided with special release magnets.

Figure 1:
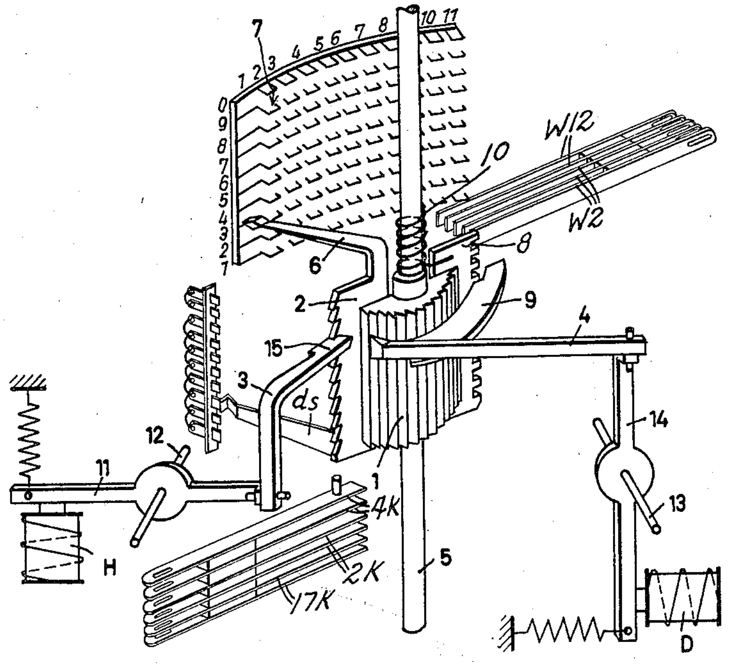
Figure 2:
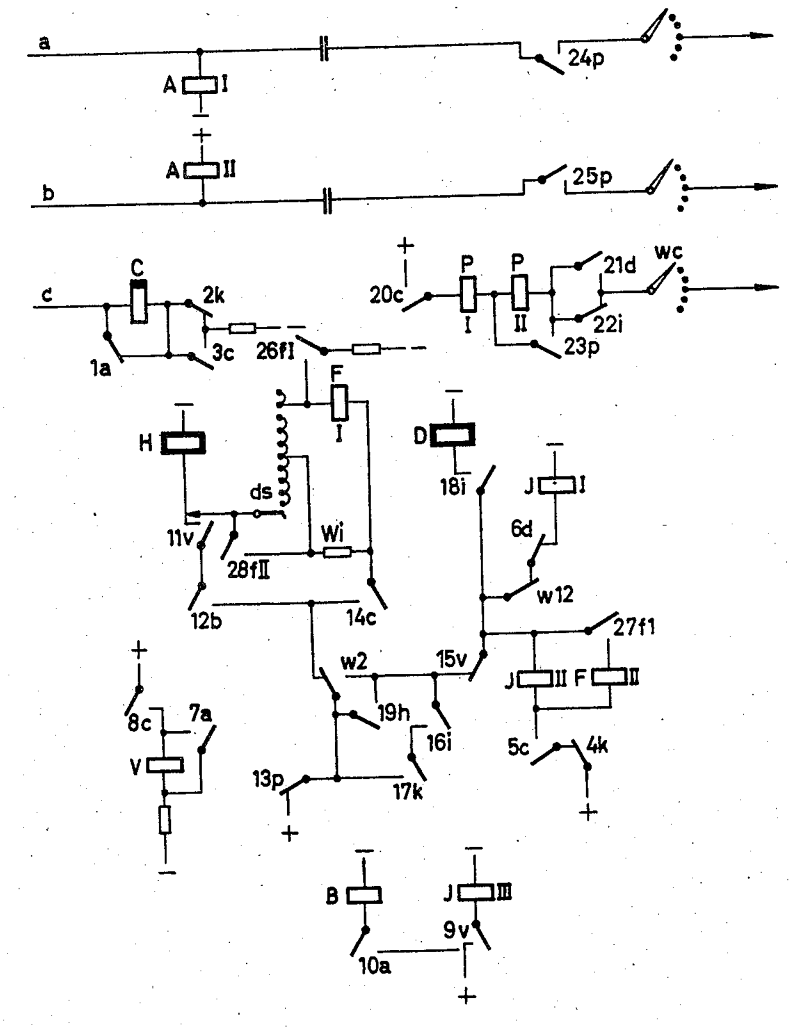

The above indicated and further objects and features will appear from the description of an embodiment of the invention which is rendered below with reference to the accompanying drawings in which Fig. 1 shows in schematic manner a constructional example of a rectangular path digit suppressor switch; and Fig. 2 shows a circuit diagram for such switch.

Referring now to the drawings, characters H and D respectively indicate the vertical and rotary magnets. As is apparent from Fig. 1, the switch shaft 5 is provided with a toothed ratchet 2 for executing the lifting or vertical motion, and with a semispherical toothed stepping member 1 for executing the rotary motion. A pawl 3 controlled by the vertical magnet H actuates the vertical ratchet 2 and a pawl 4 controlled by the rotary magnet D actuates the rotary stepping member 1. The stepping member 1 carries a guide member 8 in which are formed comblike recesses corresponding to the decade or level scheme of the contact bank, for cooperation during rotary motion, with a stationary guide segment 9. Rotary off-normal contacts *w*12 and *w*2 are provided, such contacts being actuated responsive to rotation of the rotary stepping member 8. Numeral 6 designates a switch wiper, 7 the field of bank contacts, and numeral 10 designates in schematic manner a spring for restoring the switch shaft 5. The vertical pawl 3 is normally fastened at one end of the armature 11 of the vertical magnet H, which is rotatable about the axis 12. The rotary pawl 4 is carried by the armature 14 of the rotary magnet D, such armature being rotatable about the axis 13. The vertical pawl 3 engages with each attraction of the vertical magnet H a tooth in the vertical ratchet 2, thereby lifting the switch wipers such as 6 step-by-step from level to level. An auxiliary decade wiper *ds* is at the same time moved vertically with respect to an auxiliary bank of vertically disposed contacts. Contacts 4*k*, 2*k* and 17*k* are vertical off-normal contacts which are actuated when the vertical ratchet leaves its normal position. The extension 15 of the vertical pawl 3 which engages the teeth in the ratchet member 2 is made so wide that it remains with attracted armature 11 of the vertical magnet H in engagement with a tooth in the lifting ratchet 2 until such time when the wipers have been rotated by two steps. The guide 9 for the comb 8 is recessed at the end facing the comb, so that the comb teeth engage the guide 9 only incident to the second rotary step. Accordingly, if the vertical magnet H is deenergized incident to the first rotary step, the pawl extension 15 will be disengaged from the lifting ratchet 2 and the switch shaft 5 with the wipers such as 6 (only one wiper being shown for convenience) will immediately drop into normal or initial position. However, if the vertical magnet H remains energized at least until the wipers are in engagement with the first bank contacts in a selected level, that is, up to the second rotary step, a tooth of the comb 8 will be in engagement with the guide 9 and the release of the switch shaft and wipers can be effected only after rotation over all bank contacts in the corresponding level.

Fig. 2 shows in schematic manner the circuit of a rectangular path switch operating as a digit suppressor, constructed in accordance with Fig. 1, illustrating the circuitry for controlling the switch operations to the extent required for an understanding of the invention.

When the switch is seized by a preceding switching device, line relay A will be energized over line conductors *a* and *b* and test or seizure relay C will energize in a circuit involving the private conductor *c*, vertical off-normal contact 2*k* and a resistor to battery (—), the shunt around relay C being removed by the opening of contact 1*a* controlled by relay A. Relay C upon operating closes its contact 3*c*, thereby shunting the off-normal contact 2*k*, and closes at contact 5*c* a circuit for relay J extending from +, vertical off-normal contact 4*k*, contact 5*c*, winding II of J, rotary off-normal contact *w*12, contact 6*d* of the rotary magnet, winding I of J to —. Now, when the first impulse series arrives, relay A will follow and upon deenergization will open contact 7*a* to remove the shunt around relay V whose energizing circuit was prepared over contact 8*c* upon actuation of relay C. Relay V accordingly energizes and at contact 9*v* closes a circuit for the winding III of relay J. Relay A energizes again at the conclusion of the first impulse, thereby closing at contact 10*a* a circuit for relay B extending over closed contact 9*v*, relay B closing a circuit for the vertical magnet H from —, H, 11*v*, 12*b*, rotary off-normal contact *w*2, 13*p* to +. The vertical magnet H operates and by means of its pawl 3, 15 (Fig. 1) lifts the ratchet 2 and therewith the wipers 6 by one step. Relay B releases upon restoration of relay A at the beginning of the next impulse and consequent opening of contact 10*a*, interrupting the circuit of the vertical magnet H at contact 12*b*. Upon conclusion of the impulse, relay B and therewith the vertical magnet H are reconnected. Relay V remains energized during each impulse series because it is made slow-to-release by the periodic shunting of its winding at contact 7*a*; it releases upon termination of the impulse series, causing the normal contacts 11*v* to close and thereby connecting the vertical magnet H (which had been energized over contact 12*b*) with the decade or level wiper *ds* of the switch. If the decade wiper has been set by the received impulse series in engagement with one of the contacts corresponding to decades or levels 1 to 8 in which no suppression is intended, the vertical magnet H will remain energized over low ohmic resistor W*i* and contacts 14*c*, *w*2, 13*p*. Relay J has been energized upon release of relay V over contacts 15*v* and 16*i*, in a circuit over vertical off-normal contact 17*k* which became closed responsive to the first vertical step, to ground at contact 13*p*. At contact 18*i*, relay J connects the circuit for the rotary magnet D. This magnet interrupts at contact 6*d* the circuit for relay J causing release thereof and the latter opens contact 18*i* disconnecting the rotary magnet. Contact 6*d* is accordingly closed again causing relay J to reenergize over winding I in a circuit including contact 19*h* controlled by the vertical magnet H. Relay J at contact 18*i* reconnects the rotary magnet causing the switch to execute a second rotary step. The rotary off-normal contact *w*2 is coincidently switched to alternate position interrupting the holding circuit for the vertical magnet. Since a tooth of the guide comb 8 is now in engagement with the guide 9, restoration of the switch wipers to normal or home position will require, as explained before, further rotation thereof beyond the last bank contacts in the corresponding level, thereupon dropping of the shaft and wipers, and finally return rotation to normal position. In other words, rapid restoration is now impossible. The interplay between relay J and the rotary magnet D continues, in the circuit over contact *w*2 until bank contacts associated with an idle line or trunk leading to a succeeding switch are found which is ascertained over the test or private wiper *wc*. When an idle line is found, windings I and II of test relay P will receive current over contacts 20*c* and 21*d* or 22*i* and relay P will energize. At contact 13*p*, relay P interrupts the circuits for relay J and the rotary magnet D, thus stopping the switch. Closure of contact 23*p* shunts the high resistance winding II of relay P for the purpose of busying the seized line or trunk. At contacts 24*p* and 25*p*, relay P connects the line conductors through to the succeeding switch.

However, if the first digit received should be the number 9 or 0 (digits to be suppressed), the switch wiper *ds*, upon conclusion of the corresponding impulse series will be in engagement with one of the corresponding topmost decade contacts and the winding I of relay F will be energized responsive to release of relay V. Relay F closes its contact 26*f*I in a holding circuit for its winding I. This winding has a high resistance, causing release of the vertical magnet H, and thereby disengagement of the extension 15 of pawl 3 (Fig. 1) from the ratchet 2. The switch has meantime as previously described executed one rotary step but the comb 8 is not in engagement with the guide 9. The switch shaft 5 and therewith the wipers accordingly drop quickly into normal position and the switch is thereby prepared for renewed operation responsive to receipt of a further impulse series. Vertical off-normal contact 4*k* is in the normal switch position closed again and the windings II of the relays J and F are accordingly energized in parallel over contact 27*f*I which also closed upon operation of relay F over its winding I. Contact 28*f*II of the second switching stage is now closed assuring continued energization of the vertical magnet H over the low ohmic resistor W*i* responsive to the next impulse series, independent of the position of the decade wiper *ds*, until such a time when the rotary off-normal contact *w*2 opens. Prolonged energization of the vertical magnet H thus prevents immediate release of the switch. Accordingly, even if the corresponding impulse series should denote digit 9 or 0, rapid release of the switch by deenergization of vertical magnet H cannot take place.

The invention is not inherently limited for use in telephone switching devices and the corresponding term is accordingly intended to embrace different signaling systems in which the invention can be used.

Changes may be made within the scope and spirit of the appended claims which define what is believed new and desired to have protected by Letters Patent.

We claim:

1. In an automatic telephone system, an automatic switch of the vertical-rotary type having a vertical magnet for lifting a shaft carrying wipers, responsive to impulses received, to position said wipers for rotation relative to a desired level of bank contacts, and having a rotary magnet for rotating said shaft so as to rotate said wipers relative to the bank contacts in the corresponding level, wherein the release and restoration of said wipers is effected by rotation thereof beyond the last bank contacts in the corresponding level, thereafter dropping of said shaft and said wipers to lowermost position, followed by return rotation thereof to normal, a device for adapting said switch for operation as a digit suppressor, said device comprising, decade marker means, circuit means for conducting digit-designating impulse series to said switch to cause operation of said vertical magnet, circuit means controlled by said marker means responsive to receipt of digit impulse series to be suppressed for causing immediate release of said vertical magnet to restore said switch wipers to normal, and further circuit means for causing said vertical magnet responsive to receipt of a digit impulse series to be effectively used to remain energized for the initial interval of the operation of said rotary magnet by the next successive impulse series, thereby preventing immediate release of said switch.

2. An arrangement and cooperation of parts according to claim 1, comprising two resistors, switching means which is operatively effective at the conclusion of an impulse series, and circuit means controlled by said relay and said marker means for connecting said resistors in the circuit of said vertical magnet.

3. An arrangement and cooperation of parts according to claim 2, wherein one of said resistors has a relatively low resistance.

4. An arrangement and cooperation of parts according to claim 2, wherein one of said resistors has a relatively high resistance.

5. An arrangement and cooperation of parts according to claim 4, comprising a relay having a winding constituting one of said resistors, and circuit means controlled by said relay responsive to said switch assuming normal position and reoperation thereof for connecting said second resistor which has a relatively low resistance in the circuit of said vertical magnet independent of said marker means.

6. An arrangement and cooperation of parts according to claim 5, wherein said relay operates in stages, circuit means for operatively connecting one winding of said relay to actuate such relay in its first stage after receipt of an impulse series to be suppressed, means for thereby preparing a circuit for a second winding of said relay, and means effective upon return of said switch to normal position for closing said last-named circuit for the actuation of contacts in the second stage of said relay.

7. An arrangement and cooperation of parts according to claim 3, comprising a holding circuit for said vertical magnet including said resistor having low resistance and a rotary off-normal contact which is opened responsive to rotary operation to the second rotary step of said wipers.

8. An arrangement according to claim 2, comprising an auxiliary relay for operatively connecting said vertical magnet, a line relay responsive to impulses received for actuating said auxiliary relay for the duration of the pause between two impulses, and a switch-over relay for actuating said auxiliary relay upon conclusion of an impulse series for an interval until said vertical magnet is connected to said marker means.

9. An arrangement and cooperation of parts according to claim 7, wherein the wipers of said switch engage live bank contacts responsive to the second rotary step thereof.

10. An arrangement and cooperation of parts according to claim 1, comprising a lifting pawl controlled by said vertical magnet for coaction with a corresponding lifting ratchet, the operative end of said pawl being wide enough to remain in engagement with said ratchet in excess of one rotary step of said rotary magnet.

11. An arrangement and cooperation of parts according to claim 10, comprising a stationary guide element, and a switch shaft carrying a guide comb for engagement with said guide element in the second rotary step controlled by said rotary magnet.

References Cited in the file of this patent

UNITED STATES PATENTS

| | | |
|---|---|---|
| 1,694,615 | Bellamy | Dec. 11, 1928 |
| 2,236,808 | Taylor | Apr. 1, 1941 |
| 2,513,400 | Carson et al. | July 4, 1950 |
| 2,820,101 | Pharis | Jan. 14, 1958 |